(12) United States Patent
Shaw et al.

(10) Patent No.: US 10,397,840 B2
(45) Date of Patent: Aug. 27, 2019

(54) METHOD AND APPARATUS FOR COMMUNICATION DEVICE HANDOVER

(71) Applicant: AT&T INTELLECTUAL PROPERTY I, L.P., Atlanta, GA (US)

(72) Inventors: Venson Shaw, Kirkland, WA (US); Sangar Dowlatkhah, Alpharetta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 32 days.

(21) Appl. No.: 15/351,638

(22) Filed: Nov. 15, 2016

(65) Prior Publication Data

US 2018/0139670 A1    May 17, 2018

(51) Int. Cl.
*H04W 36/08* (2009.01)
*H04W 36/00* (2009.01)
(Continued)

(52) U.S. Cl.
CPC ....... *H04W 36/08* (2013.01); *H04W 36/0061* (2013.01); *H04W 84/045* (2013.01); *H04W 88/02* (2013.01); *H04W 88/08* (2013.01)

(58) Field of Classification Search
CPC ............. H04W 36/08; H04W 36/0061; H04W 84/045; H04W 88/08; H04W 88/02
See application file for complete search history.

(56) References Cited

U.S. PATENT DOCUMENTS 6,112,081 A    8/2000   Namura et al.
7,027,801 B1*  4/2006   Hall ................... G06Q 30/02
                                            455/412.1
(Continued)

FOREIGN PATENT DOCUMENTS

CN    102421104 A    4/2012
CN    103139877 A    6/2013
(Continued)

OTHER PUBLICATIONS

Azuaje, Consuelo, "ZTE and Intel Collaborate to Produce World's First SDN/NFV 5G RAN Solution", http://www.jbrehm.com/blog/2017/3/9/zte-and-intel-collaborate-to-produce-worlds-first-sdnnfv-5g-ran-solution, Mar. 9, 2017, pp. 1-3.
(Continued)

*Primary Examiner* — Chirag G Shah
*Assistant Examiner* — Joshua Smith
(74) *Attorney, Agent, or Firm* — Guntin & Gust, PLC; Mark Wilinski

(57) ABSTRACT

Aspects of the subject disclosure may include, for example, a method including receiving, from a first network, a first node identifier associated with a second network, transmitting the first node identifier to a small cell node, receiving a handover initiation signal from the first network responsive to a request for a handover, from a macro cell node of the second network to the small cell node of the first network, of a communication session associated with a first wireless communication link to a communication device, where the request is triggered at the second network responsive to identification of the first node identifier in a first wireless signal from the communication device, and where the first node identifier is obtained by the communication device via a second wireless signal from the small cell node, and facilitating a second wireless communication link to the communication device via the small cell node to complete the handover. Other embodiments are disclosed.

20 Claims, 6 Drawing Sheets

(51) Int. Cl.
*H04W 88/02* (2009.01)
*H04W 88/08* (2009.01)
*H04W 84/04* (2009.01)

(56) References Cited

U.S. PATENT DOCUMENTS

| | | | |
|---|---|---|---|
| 7,257,404 B1* | 8/2007 | Chow | H04W 36/0083 |
| | | | 370/331 |
| 8,526,931 B1 | 9/2013 | Fraley et al. | |
| 9,031,606 B2 | 5/2015 | Daniel | |
| 9,338,723 B2 | 5/2016 | Aguirre | |
| 9,374,289 B2 | 6/2016 | Chang et al. | |
| 9,467,910 B2 | 10/2016 | Laganier | |
| 9,532,220 B2 | 12/2016 | Lee et al. | |
| 2007/0097983 A1* | 5/2007 | Nylander | H04L 61/1511 |
| | | | 370/395.2 |
| 2007/0121557 A1* | 5/2007 | Sylvain | G01S 1/68 |
| | | | 370/338 |
| 2009/0067417 A1* | 3/2009 | Kalavade | H04L 12/66 |
| | | | 370/356 |
| 2011/0206011 A1* | 8/2011 | Ishida | H04W 36/0083 |
| | | | 370/331 |
| 2012/0100856 A1* | 4/2012 | Ishida | H04W 36/04 |
| | | | 455/436 |
| 2012/0100861 A1* | 4/2012 | Zhang | H04W 24/00 |
| | | | 455/444 |
| 2012/0129537 A1* | 5/2012 | Liu | H04W 36/04 |
| | | | 455/444 |
| 2012/0294278 A1* | 11/2012 | Wang | H04W 28/18 |
| | | | 370/331 |
| 2013/0084873 A1* | 4/2013 | Sharony | H04W 36/14 |
| | | | 455/438 |
| 2013/0273934 A1 | 10/2013 | Meredith et al. | |
| 2014/0036656 A1 | 2/2014 | Chou et al. | |
| 2014/0045505 A1* | 2/2014 | Henry | H04W 36/0061 |
| | | | 455/444 |
| 2015/0018002 A1* | 1/2015 | Touag | H04W 16/14 |
| | | | 455/454 |
| 2015/0092551 A1* | 4/2015 | Moisand | H04L 67/146 |
| | | | 370/389 |
| 2015/0173004 A1 | 6/2015 | Nigam et al. | |
| 2016/0007255 A1 | 1/2016 | Sharma et al. | |
| 2016/0044531 A1 | 2/2016 | Papa et al. | |
| 2016/0112943 A1 | 4/2016 | Horn et al. | |
| 2016/0127889 A1 | 5/2016 | Cui | |
| 2016/0135106 A1* | 5/2016 | Shinada | H04W 16/32 |
| | | | 455/440 |
| 2016/0143015 A1 | 5/2016 | Marsch et al. | |
| 2016/0157147 A1 | 6/2016 | Saghir et al. | |
| 2016/0157252 A1 | 6/2016 | Lu et al. | |
| 2016/0174125 A1 | 6/2016 | Kobayashi et al. | |
| 2016/0183153 A1 | 6/2016 | Yuan-Jung et al. | |
| 2016/0191471 A1 | 6/2016 | Ryoo et al. | |
| 2016/0234759 A1 | 8/2016 | Kubota et al. | |
| 2016/0316479 A1 | 10/2016 | Choi et al. | |
| 2016/0352866 A1* | 12/2016 | Gupta | H04L 67/42 |
| 2016/0353465 A1 | 12/2016 | Vrzic et al. | |
| 2016/0381528 A1 | 12/2016 | Lee et al. | |
| 2017/0070892 A1 | 3/2017 | Song et al. | |
| 2017/0079059 A1 | 3/2017 | Li et al. | |
| 2017/0111887 A1 | 4/2017 | Hong et al. | |
| 2017/0118689 A1 | 4/2017 | Zhang et al. | |
| 2017/0325274 A1* | 11/2017 | Xu | H04W 76/025 |

FOREIGN PATENT DOCUMENTS

| | | |
|---|---|---|
| WO | 2015039345 A1 | 3/2015 |
| WO | 2016085109 A1 | 6/2016 |
| WO | 2016107044 A1 | 7/2016 |
| WO | 2016122589 A1 | 8/2016 |
| WO | 2016126238 A1 | 8/2016 |
| WO | 2017012402 A1 | 1/2017 |
| WO | 2017058067 | 4/2017 |
| WO | 2017059829 | 4/2017 |

OTHER PUBLICATIONS

Mayer, Hans-Peter, "H2020—Phases 2 and 3", Bell Labs, Alcatel-Lucent; www.alcatel-lucent.com, Sep. 2014, 1-20.

Van De Velde, Thierry, "Native bridged communication in a cellular access network", https://wifinowevents.com/2016/usa/news-blogs/native-bridged-communication-in-a-cellular-access-network/, Sep. 17, 2016, pp. 1-3.

Westerberg, Erik, "4G/6G RAN architecture: how a split can make the difference", Ericsson Technology Review, Jul. 22, 2016, pp. 1-16.

* cited by examiner

100

400

METHOD AND APPARATUS FOR COMMUNICATION DEVICE HANDOVER

FIELD OF THE DISCLOSURE

The subject disclosure relates to a method and apparatus for communications device handover.

BACKGROUND

Modern telecommunications systems provide consumers with telephony capabilities while accessing a large variety of content. Consumers are no longer bound to specific locations when communicating with others or when enjoying multimedia content or accessing the varied resources available via the Internet. Network capabilities have expanded and have created additional interconnections and new opportunities for using mobile communication devices in a variety of situations. Intelligent devices offer new means for experiencing network interactions in ways that anticipate consumer desires and provide solutions to problems.

BRIEF DESCRIPTION OF THE DRAWINGS

Reference will now be made to the accompanying drawings, which are not necessarily drawn to scale, and wherein.

DETAILED DESCRIPTION

Figure 1:
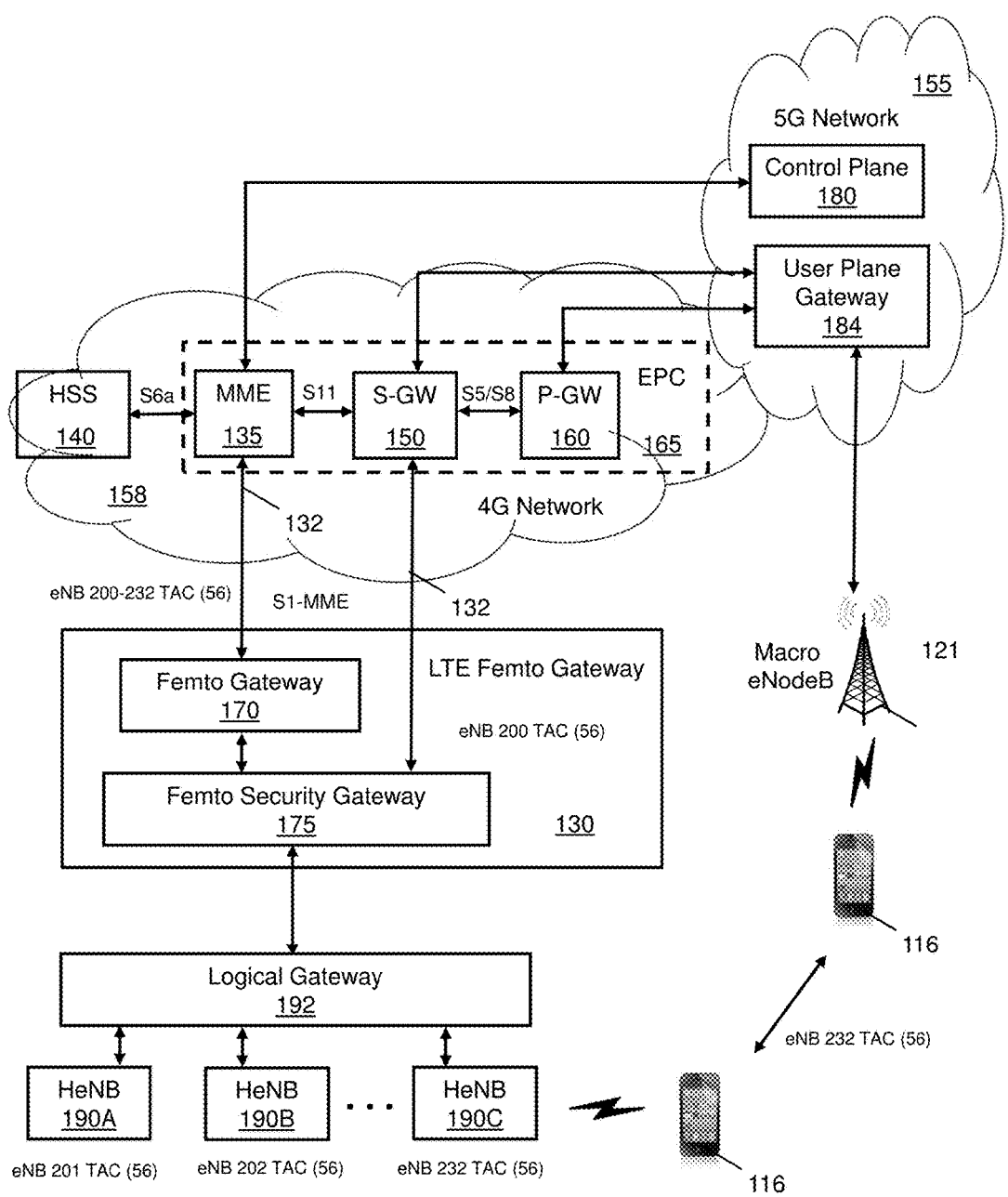
FIG. 1 depicts illustrative embodiments of a system for communication device handover.

The subject disclosure describes, among other things, illustrative embodiments for facilitating handovers in a communication system that includes different generations of cellular networks. For example, a communications network can include a Long-Term Evolution (LTE), or Fourth Generation (4G), cellular network and a Fifth Generation (5G) cellular network. Each of these networks can include different architectures for supporting communication sessions, particularly architectures for configuring and supporting a control plane and user plane activities for a communication session (e.g., voice and/or data session). An active communication session involving a communication device that is wireless connected to a 5G network can be handed over (or, alternatively, handed-in) to a 4G network in a situation where the communication device can engage in wireless communications with the 4G network and where a handover process can switch from the 5G network to the 4G network without disrupting the communication session.

A 5G network can wirelessly connect to communication devices via Macro eNodeB elements (or, alternatively, Macro Cells). A 4G network can include LTE Femtocell Gateways (or, alternatively, LTE Femto Gateways) that can further connect to Small Cells (or, alternatively, Home eNodeB (HeNB) elements). These Small Cells can also wirelessly connect to communication devices. To handover from the 5G network to the 4G network, the Macro Cell elements of the 5G network and the LTE Femto Gateway and Small Cell elements of the 4G network must share information in a way that facilitates decision making and coordinated action.

The LTE Femto Gateway of the 4G network can receive one or more node identifiers that are known to the Macro Cell of the 5G network. The LTE Femto Gateway can assign one node identifier to each Small Cell that is connected to the LTE Femto Gateway as a means of accessing the 4G network. The LTE Femto Gateway can receive a location identifier that is compatible with location identifiers that are used by the Macro Cell of the 5G network and can assign the location identifier to each Small Cell that is connected to the LTE Femto Gateway.

A communication device that is engaged in an on-going communication session with a 5G network via a Macro Cell can wirelessly detect (or be detected by) a Small Cell of a 4G network. The Small Cell can share its node identifier and location identifier with the communication device. The communication device can then share the node identifier and/or the location identifier with the Macro Cell. The Macro Cell can recognize the node identifier and/or location identifier, even though the Small Cell is otherwise unknown to the 5G network. The Macro Cell can then decide whether to initiate a hand-in of the on-going communication session from the 5G network to the 4G network. If so, then the Macro Cell can send a handover request to the 4G network. The LTE Femto Gateway can ultimately receive a handover initiation signal from the 4G network, based on the request, and can coordinate the process of facilitating a wireless link to the communication device and a communication channel between the communication device and the 4G network. The LTE Femto Gateway can complete the handover of the on-going communication session to the 4G network without interruption of the on-going communication session.

One or more aspects of the subject disclosure include a machine-readable storage medium, including executable instructions that, when executed by a processing system including a processor, facilitate performance of operation, including facilitating a first communication link with a first network and facilitating a second communication link with a small cell node. The operations can include receiving, from the first network via the first communication link, a first location identifier associated with a location known to the second network and, in turn, transmitting the first node identifier and the first location identifier to the small cell node via the second communication link. The operations can also include receiving a handover initiation signal from the first network responsive to a request for a handover, from a macro cell node of the second network to the small cell node of the first network, of a communication session associated with a first wireless communication link to a communication device. The request can be triggered at the second network responsive to identification of the first node identifier and the first location identifier in a first wireless signal from the communication device. The first node identifier and the first location identifier can be obtained by the communication device via a second wireless signal from the small cell node. The operations can include facilitating, via the first communication link and the second communication link, a second wireless communication link to the communication device via the small cell node to complete the handover of the communication session to the small cell node of the first network.

One or more aspects of the subject disclosure include a device, including a processing system including a processor and a memory that stores executable instructions that, when executed by the processing system, facilitate performance of operations, including receiving, from a first network, a first node identifier associated with a second network and receiving, from the first network via, a first location identifier associated with a location known to the second network. The operations can include transmitting the first node identifier and the first location identifier to a small cell node. The operations can also include receiving a handover initiation signal from the first network responsive to a request for a handover, from a macro cell node of the second network to the small cell node of the first network, of a communication session associated with a first wireless communication link to a communication device. The request can be triggered at the second network responsive to identification of the first node identifier and the first location identifier in a first wireless signal from the communication device. The first node identifier and the first location identifier can be obtained by the communication device via a second wireless signal from the small cell node. The operations can also include facilitating a second wireless communication link to the communication device via the small cell node to complete the handover of the communication session to the small cell node of the first network.

One or more aspects of the subject disclosure include a method including receiving, by a processing system including a processor and from a first network, a first node identifier associated with a second network and, in turn, transmitting, by the processing system, the first node identifier to a small cell node. The method can include receiving, by the processing system, a handover initiation signal from the first network responsive to a request for a handover, from a macro cell node of the second network to the small cell node of the first network, of a communication session associated with a first wireless communication link to the communication device. The request can be triggered at the second network responsive to identification of the first node identifier in a first wireless signal from the communication device. The first node identifier can be obtained by the communication device via a second wireless signal from the small cell node. The method can also include facilitating, by the processing system, a second wireless communication link to the communication device via the small cell node to complete the handover of the communication session to the small cell node of the first network.

In FIG. 1, a communication system 100 is illustrated. The system 100 can provide wireless communication services, including voice, video, and/or data services to wireless communication devices 116. The system 100 can be a simplified version of a larger mobile communications network. System 100 can enable wireless communication services for various devices over various networks. For example, the wireless communication devices can include mobile communication devices 116, such as cellular phones, smart phones, personal data devices, Internet of Things (IOT) devices, and/or vehicle-based devices. The wireless communication devices 116 can include stationary devices and mobile devices, devices that are capable of telephony and devices not capable of telephony, devices with user interfaces and displays, and devices that do not includes means for user interaction. For example, the wireless communication devices 116 can include Internet of Things (IoT) devices that are intended to provide Machine-to-Machine (M2M) communications without user input, such as, sensors, meters, location detectors, security monitors, and other machines that can provide information without human intervention. The system 100 can connect communication devices 116 to a common mobile communication network that can provide further interconnectivity to an IP Multimedia Subsystem (IMS) network, an Internet Network, a Public Switched Telephone Network (PSTN), and/or other networks.

In one or more embodiments, the system 100 can one or more networks 155 and 158. For example, the system 100 can include a Long-Term Evolution (LTE) or Fourth Generation (4G) cellular network 158 and a Fifth Generation (5G) cellular network 155. In one embodiment, the 4G network 158 and 5G network 155 can be part of a common network. For example, the 4G network 158, or portions of a 4G network 158 can be included in a 5G network 155. In one or more embodiments, the cellular networks 155 and 158 can include elements or functions that are implemented via Software Defined Network (SDN) techniques. For example, the User Plane Gateway (User Plane GW) 184 and/or Control Plane Gateway (Control Plane GW) 180 of the 5G network 155 can be implemented as Virtual Network Function (VNF) elements that can be instantiated into the 5G network 155 under the direction of a SDN Controller.

In one or more embodiments, each of the cellular networks 155 and 158 can include different architectures for supporting communication sessions, particularly architectures for configuring and supporting control plane and user plane activities for communication sessions (e.g., voice and/or data). For example, a 5G network 155 can separate control plane and user plane processing via a Control Plane GW 180 and a User Plane GW 184, which can be located remote from each other and/or distributed across and/or outside of the 5G network 155. By contrast, the 4G network can maintain a discrete, Evolved Packet Core (EPC) 165 within the 4G network 158 for processing both Control Plane and User Plane information. For example, the EPC 165 can include a Mobile Management Entity (MME) 135, a Service Gateway (S-GW) 150, and a Packet Data Network Gateway (P-GW) 160 for establishing communication sessions and processing user data. The 4G network 158 can also include a Home Subscription Server (HSS) 140 for facilitating verification of communication devices 116 and/or user configurations to the 4G network 158.

In one or more embodiments, in addition to the wireless communication devices 116, the system 100 can include one or more Macro eNodeB nodes 121 (or, alternatively, Macro Cell Nodes), which can provide air-to-air, wireless connection between a wireless communication device 116 and a cellular network, such as the 5G network 155. In one embodiments, a Macro eNodeB node 121 can communicate with a 5G network 155 via a transport layer. In one or more embodiments, the Macro eNodeB node 121 can include an air interface to, for example, an LTE-Uu network. In one embodiment, the air interface can support an E-UTRAN-based LTE-Uu network, which can further support downlink and uplink protocols, including Orthogonal Frequency-Division Multiple Access (OFDMA) protocol and/or Single-Carrier Frequency-Division Multiple Access (SC-FDMA) protocol. The LTE-Uu interface can enable the eNodeB node 121 to receive requests for connection to the 5G network 155 from various types of wireless communication devices 116.

In one or more embodiments, a Macro eNodeB node 121 can support wide frequency band, or LTE carrier, wireless communications to connect with, for example, communication devices 116 such as standard smart phone devices. The Macro eNodeB node 121 can also support narrow frequency band, or NB-IoT carrier, wireless communications to connect with communication devices 116, such as wireless utility meters, machine installations, thermostats, and the like.

In one or more embodiments, the system 100 can include one or more Radio Access Networks (RAN) or Radio Access Technologies (RAT) for interfacing the Macro eNodeB nodes 121 with the wireless communication devices 116. In one embodiment, the system 100 can utilize a Universal Terrestrial Radio Access Network (UTRAN) 120 capable of supporting a wireless interface to a wireless communication device 116 in a Third Generation Wireless Mobile Communication Technology (3G) system. In this example, the wireless communication device 116 can support 3G IoT user equipment (3G IoT UE). In one embodiment, the system 100 can include a Long-Term Evolution (LTE) Radio Access Technology (RAT) network, or an LTE-Uu network, such as an Evolved UMTS Terrestrial Radio Access Network (E-UTRAN), a Universal Mobile Telecommunications System (UMTS), a Global System for Communications (GSM) network, an Evolution Data Only (EVDO) network, or a Code Division Multiple Access (CDMA) network. An LTE-Uu network can provide radio communication assets for wireless connectivity between a wireless communication device 116 and a Mobile Packet Core (MPC) of the system 100. A LTE-Uu network can utilize a number of interfaces, including Iu, Uu, Iub and/or Iur.

In one or more embodiments, the 4G network can include a Mobility Management Entity (MME) 135, a Serving Gateway (S-GW) 150, and a PDN Gateway (P-GW) 160, which can form an Evolved Packet Core (EPC) 165 for processing both Control Plane and User Plane information.

In one or more embodiments, the 4G network 158 can include a Home Subscriber Server (HSS) 140 that can provide a central database that contains user-related and subscription-related information. The functions of the HSS 140 can include mobility management, call and session establishment support, user authentication and access authorization. In one embodiment, the HSS 140 can manage subscription-related information in real time, for multi-access and multi-domain offerings in an all-IP environment. The HSS 140 can be based on Home Location Register (HLR) and Authentication Center (AuC).

In one or more embodiments, a 4G network 158 can carry many traffic types, including IP-based packet data network (PDN) traffic and non-IP PDN traffic. The 4G network 158 can use, for example, an E-UTRAN-based LTE-Uu network can be used with the 4G network 158 and can include one or more Macro eNodeB nodes, as well as LTE Femto Gateway nodes 130, that can be connected to one other via X2 interfaces and which can be further connected to the 4G network 158 via an S1-C interface, an S1-MME interface, and/or an S1-U interface. For example, an E-UTRAN-based LTE-Uu can use various communication techniques including orthogonal frequency-division multiplexing (OFDM), multiple-input multiple-output (MIMO) antenna technology depending on the capabilities of the terminal, and beam forming for downlink to support more users, higher data rates and lower processing power required on each handset.

In one or more embodiments, the system 100 can include a Long-Term Evolution Femtocell Gateway (LTE Femto GW) 130. The LTE Femto GW 130 can manage a group of Home eNodeB (HeNB) nodes 190A-C (alternatively, Small Cell nodes). The primary function of the LTE Femto GW 130 is to enable seamless and highly secure access to the 4G network 158 for communication devices 116 as those devices roam between locations served by the 4G network 158 and/or other networks 155. The LTE Femto GW 130 can prove an aggregation function that allows a group of HeNB nodes 190A-C to function as a group of Small Cell (or Small Femtocell) Access Points (AP) while using a single communication link to the 4G network 158. This approach allows the LTE Femto GW 130 to preserve the legacy architecture of the 4G network 158, particularly the EPC 165, by limited exposure of the EPC 165 to a large number of HeNB nodes 190A-C. In one or more embodiments, the LTE Femto GW 130 can include a Femto Gateway 170 and a Femto Security Gateway (Se-GW) 175. The Femto Gateway 170 can carry communication from the HeNB nodes 190A-C to the MME 135. The Femto Security Gateway (Se-GW) 175 can provide secure communication between the HeNB nodes 190A-C and the Femto Gateway 170 via a secure protocol such as, for example, IPsec tunneling. Alternatively, the LTE Femto GW 130 can use the Femto Security Gateway 175 for authenticating each HeNB node 190A-D and/or for terminating encrypted IPsec data connections to any HeNB node 190A-C that fails authentication or that raises a security issue. In one or more embodiments, the system 100 can include a Logical Gateway 192 for multiplexing the resources of the LTE Femto Gateway 130 between the HeNB nodes 190A-C. In one embodiment, the Logical Gateway 192 can be incorporated into the LTE Femto Gateway 130.

In one or more embodiments, the LTE Femto Gateway 130 can support S1-MME & S1-U Network Interfaces for communicating with the 4G network 158 and/or the Logical Gateway 192 and/or the HeNB nodes 190A-C. In one or more embodiments, the LTE Femto Gateway 130 can support selected offloading of IP Traffic Offload by implementing Local S-GW and/or P-GW functionality within the LTE Femto Gateway 130 to provide a Denial of Service (DoS) shield to protect the EPC 165 (e.g., the S-GW 159 and the MME 135) by detecting and filtering out attack traffic while maintaining the QoS of for useful traffic. In one or more embodiments, the LTE Femto Gateway 130 can include configuration and management functions for the HeNB nodes 190A-C. In one embodiment, the LTE Femto Gateway 130 can provide a portal accessible interface for configuring HeNB nodes 190A-C.

In one or more embodiments, the LTE Femto Gateway 130 can provide functions for controlling and aggregating control-plane functions that are used for facilitating communication sessions with communication devices 116. The LTE Femto Gateway 130 can register and route the S1-MME signaling traffic from a large number of HeNB nodes 190A-C that are, in turn, supporting a large number of registered communication devices 116. In one embodiment, the LTE Femto Gateway 130 can provide, to the MME 135, visibility into functionality and traffic at the cluster of HeNB nodes 190A-C. In one or more embodiments, the LTE Femto Gateway 130 can provide aggregation of User Plane data from a cluster of HeNB nodes 190A-C. The cluster of HeNB nodes 190A-C can be viewed by the S-GW 150 as a single entity, while each of the HeNB nodes 190A-C is handled as a virtual entity by the LTE Femto Gateway 130. Similarly, the LTE Femto Gateway 130 can aggregate the Control Plane functions.

In one or more embodiments, the HeNB nodes 190A-C can perform many of the same functions as the Macro eNodeB 121 described above. However, the HeNB nodes 190A-C can provide small coverage areas, such as would be useful for providing wireless cellular access in an indoor premises or a public establishment.

In one or more embodiments, a 5G network 155 can wirelessly connect to a communication device 116 via a Macro eNodeB node 121. In one or more embodiments, the Macro eNodeB nodes 121 can perform operations consistent with the 3GPP standard. For example, a Macro eNodeB 121 can request attachment of a communication device 116 to the 5G network 155. For example, upon powering up, the communication device 116 can attach to a RAN, which can include the LTE-Uu, and to the Macro eNodeB node 121. Further, the communication device 116 can seek to attach to the 5G network 155 via a Control Plane 180 that is within a given geographic coverage area, typically of a local RAN. In one or more embodiments, if the communication device 116 does not have any type of activity over a certain time period, then the communication device 116 can enter into an IDLE mode in order to preserve its battery life. In one embodiment, the communication device 116, the Macro eNodeB node 121, and the Control Plane 180 can support an extended IDLE mode DRX capability that can save radio transmission power, as well as further extend the battery life of the communication device 116. An internal or external trigger can cause the communication device 116 to transmit data. In this case, the communication device 116 may need to establish a data connection to be able to engage in data transfer with the 5G network 155 and/or a target application service and/or a target application provider.

In one or more embodiments, an active communication session involving the communication device 116 and the 5G network 155 can be established. However, since the communication device 116 can be mobile in nature, the communication device that is wireless connected to the 5G network 155 may, in fact, enter locations and/or resource scenarios, where it becomes advantageous to hand-in the communication device 116 and its current communication session to a different entity. For example, a communication session can be handed in from the 5G network 155 to the 4G network 158 in a situation, where the communication device 116 can beneficially engage in wireless communications with the 4G network 158, and where a handover process can reliably switch from the 5G network 155 to the 4G network 158 without disrupting the communication session.

In one or more embodiments, a handover from the 5G network 155 to the 4G network 158 can be accomplished between the Macro eNodeB node 121 of the 5G network 155 and a HeNB node 190C of the 4G network 158. However, because the HeNB node 190C is operating in a hierarchically hidden position within a different network 158, the Macro eNodeB node 121 will not have sufficient information to identify the HeNB node 190C if the HeNB node 190C is presented to the Macro eNodeB node 121 as a potential handover partner. The Macro eNodeB node 121 can derive information from the 4G Network 158 via, for example, the MME 135. However, the HeNB nodes 190A-C are effectively virtual devices that are not visible to the 5G network 155. Therefore, to deal with this issue, a HeNB node 190C that would serve as a handover site for a current communication session at the Macro eNodeB node 121 can share information with the Macro eNodeB node 121 for identification purposes. This information can be in a form that is identifiable for the Macro eNodeB node 121. The Macro eNodeB node 121 can use the shared information to facilitate decision making and coordinated action for completing a handover process, if warranted.

In one or more embodiments, the LTE Femto Gateway 130 of the 4G network 158 can receive one or more node identifiers that are known or discernable to the Macro eNodeB node 121 of the 5G network 155. To be able to hand-in from the Macro eNodeB node 121 to the "virtual network" that includes the HeNB node 190C, with minimum changes to the 5G network 155, the LTE Femto Gateway 130 of the 4G network 158 can manage a portion of the hand-in method and can preemptively insure that the HeNB nodes 190A-C have proper information for participation in a hand-in process.

In one embodiment, the LTE Femto Gateway 130 can access one or more node identifiers that can function as if they were node identifiers in a 5G network 155. For example, the LTE Femto Gateway 130 can access a node identifier or a set of node identifiers. Node identifiers can be obtained, in one embodiment, from the MME 135. In one example, the node identifier can be a 5G eNB ID that could be similarly used to identify a macro 5G eNB. In one example, the LTE Femto Gateway 130 can receive a set of 5G eNB identifiers, where the identifiers are in the form of 5G eNB IDs numbering from eNB 200 through eNB ID 232. In one or more embodiments, the LTE Femto Gateway 130 can assign these "virtual" 5G eNB IDs to the HeNB nodes 190A-C, such that each HeNB node 190A-C receives a unique node identifier with respect to the LTE Femto Gateway 130. In addition, the LTE Femto Gateway 130 can itself be assigned a virtual 5G eNB ID. In the illustrative example, the LTE Femto Gateway 130 can be assigned the node identifier eNB 200, while Small Cell HeNB 190A is assigned eNB 201, HeNB 190B is assigned eNB 202, and HeNB 190C is assigned eNB 232.

In one or more embodiments, the LTE Femto Gateway 130 can access a location identifier that can function as if it were a location identifier in a 5G network 155. Within a 5G network 155, Tracking Area Codes (TAC) can be used to identify locations, where one or more Macro eNodeB cells 121 are located. For example, a group of Macro eNodeB cells 121 or other eNodeB cells in the 5G network 155 may share a common TAC that depends upon a geographical location into which the eNodeB cells can be grouped. In one embodiment, the LTE Femto Gateway 130 can access a location identifier from the 4G network 158. For example, the LTE Femto Gateway 130 can access a TAC from the MME 135. In another embodiment, the LTE Femto Gateway 130 can derive its own location identifier based on Global Positioning System (GPS) information. The LTE Femto Gateway 130 can assign the location identifier to itself and to the HeNB nodes 190A-C that are connected to the LTE Femto Gateway 130. For example, the LTE Femto Gateway 130 can access and assign a TAC of TAC (56) to itself and to its connected Small Cell HeNB nodes 190A-C.

In one or more embodiments, a communication device 116 can be engaged in an on-going communication session with a 5G network 155 via a Macro eNodeB cell 121. The communication device 116 can, at the same time, wirelessly detect (or be detected by) a HeNB node 190C of the 4G network 158. Upon detection of (or by) the HeNB node 190C, the communication device 116 can request (or receive automatically) information from the HeNB node 190C. This information can include the node identifier and/or the location identifier that the LTE Femto Gateway 130 has provided to the HeNB node 190C. For example, the HeNB node 190C can transmit the node identifier and location identifier information to the communication device 116 in the form of the eNB 232 and TAC (56).

In one or more embodiments, upon detecting the available HeNB node 190C, the communication device 116 can report this Small Cell as a potential candidate to hand into. In one embodiment, the communication device 130 can transmit a message to the Macro eNodeB 121 indicating that it has detected the HeNB node 190C as a possible hand-in candidate. The communication device 116 can include the node identifier and location identifier information in its message to the Macro eNodeB 121. In one or more embodiments, the Macro eNodeB 121 can recognize the node identifier and location identifier as being consistent with the eNB ID and the TAC and/or Tracking Area ID that are used by the 5G network 155 for identifying eNodeB cells and/or identifying the location of groups of eNodeB cells.

In one or more embodiments, the Macro eNodeB 121 can determine, from the eNB ID and the TAC and/or Tracking Area ID that the HeNB node 190C is a Micro network and that the Macro eNodeB 121 should be able to locate and hand over the communication session to the HeNB node 190C via the 4G network, if desired. In one or more embodiments, the Macro eNodeB 121 can initiate the handover by sending a message to the 4G network 158 requesting the handover and identifying the HeNB node 190C. In one embodiment, the Macro eNodeB 121 transmit the request to the MME 135 via the Control Plane Gateway 180 of the 5G network 155. The MME 135 can respond to the request for a hand-in from the Macro eNodeB 121 by sending a handover initiation signal to the LTE Femto Gateway 130. The handover initiation signal can identify the specific HeNB 190C by referencing the node identifier (eNB 232) that was provided to the Macro eNodeB 121. In one or more embodiments, the LTE Femto Gateway 130 can then carry out the rest of the handover procedure for the given HeNB node 190C as if the LTE Femto Gateway 130 was a "virtual MME" to the HeNB node 190C. The LTE Femto Gateway 130 can receive a handover initiation signal from the 4G network 158 and then coordinate the process of facilitating a wireless link and communication channel with the communication device 137. The LTE Femto Gateway 130 can complete the handover of the on-going communication session to the 4G network 158 without interruption of the communication session.

In one or more embodiments, the LTE Femto Gateway 130 can forward a connection request from the communication device 116 to the MME 135. An authentication request for the communication device 116 can flow to the MME 135, for example, via a Non-Access Stratum (NAS) protocol message. The NAS protocol authentication request can flow directly from the communication device 116 to the MME 135, via a tunneling protocol (GTP) link between Macro eNodeB 121 and the MME 135. At the MME 135, the authentication request can be converted to an Internet Engineering Task Force (IETF) standard authentication message protocol, such as the Diamond protocol. The converted, authentication message in the Diamond protocol can be forwarded to a Home Subscription Service (HSS) server 140 for verification of the authentication request for the communication device 116. In one embodiment, when the communication device 116 is booted up, it can send an attach request or an authentication request to the MME 135 via the LTE Femto Gateway 130.

In one or more embodiments, if a communication device 116 is being authenticated and connected to the network 100, then the HSS 140 can return a successful authentication, and the MME 135 can perform control plane functions for enabling IP PDN communications with the Internet 155. In one embodiment, the MME 135 can assign one or more bearer gateways 150 and 160 for use in transporting user data to and from the mobile communication device 116. For example, the MME 135 can assign one or more default bearer gateways 150 and 160 and/or one or more dedicated bearer gateways 150 and 160.

In one or more embodiments consistent with the 3GPP standard, after the MME 135 has performed assignment of bearer gateways 150 and 160 for the mobile communication device 116, the MME 135 can further perform updates and handovers on behalf of the mobile communication device 116 as it moves between various LTE-Uu wireless network locations. The MME 135 can assign initial bearer gateways 150 and 160 for the mobile communication device 116 based on location information associated with the mobile communication device 116. However, if the mobile communication device 116 moves to a different location, then the MME 135 can be required to update the assignment of the bearer gateways 150 and 160 to fulfill performance requirements. Hence, the MME 135 can assign and maintain bearer pathways for user data for the mobile communication device 116. In one or more embodiments, the LTE Femto Gateway 130 can support a tunneling protocol pathway for authentication, control plane, and user plane for the mobile communication device 116.

In one or more embodiments, the MME 135 can also perform functions such as idle mode tracking and paging procedure including retransmissions. The MME 135 can choose an S-GW 150 for the mobile communication device 116. The S-GW 150 can route and forward user data packets, while also acting as the mobility anchor for the user plane during inter-eNodeB handovers and as the anchor for mobility between LTE and other 3GPP technologies. For a wireless communication device 116 in idle state, the S-GW 150 can terminate a downlink data path and can trigger paging when downlink data arrives for the mobile communication device 116. The S-GW 150 can manage and can store contexts, such as parameters of an IP bearer service and/or network internal routing information.

In one or more embodiments, the PDN Gateway (P-GW) 160 can provide user plane connectivity from the mobile communication device 116 to external packet data networks, including the Internet 155, by being the point of exit and entry of traffic for the mobile communication device 116. The mobile communication device 116 can have simultaneous connectivity with more than one P-GW 160 for accessing multiple PDNs. The P-GW 160 can perform policy enforcement, packet filtering for each user, charging support, lawful interception and/or packet screening. The P-GW 160 can also act as the anchor for mobility between 3GPP and non-3GPP technologies such as WiMAX and 3GPP2 (CDMA 1× and EvDO).

Figure 2:
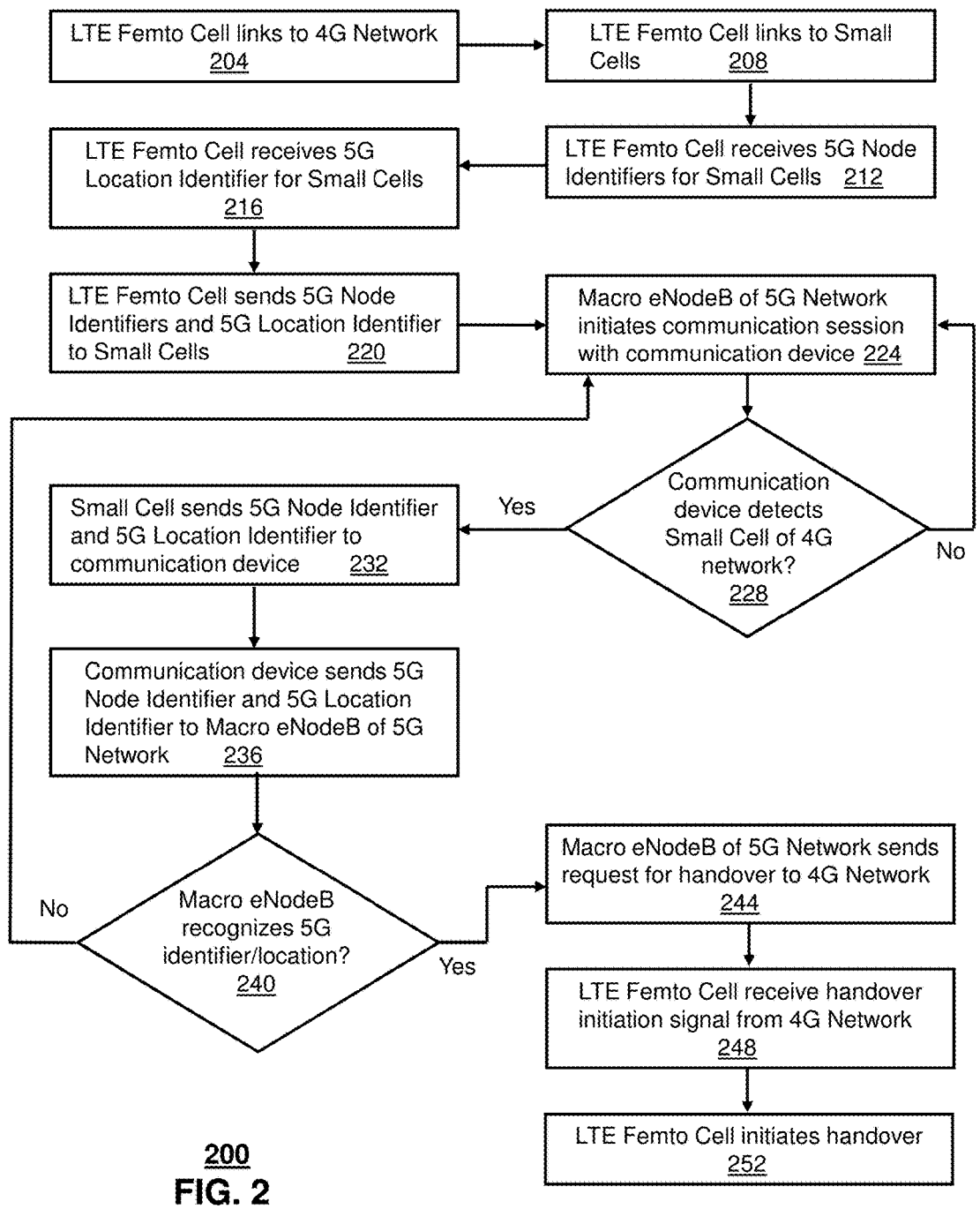
FIG. 2 depicts illustrative embodiments of method used in portions of the systems described in FIG. 1.

FIG. 2 depicts an illustrative embodiment of a method 200 used in portions of the described in FIG. 1 for handing over a communication device from a Macro eNodeB 121 of a 5G network 155 to an HeNB node 190C of a 4G network 158. The method can include, in step 204, the LTE Femto Cell linking to the 4G Network. In step 208, the LTE Femto Cell can link to one or more Small Cells (HeNB nodes). In steps 212 and 216, the LTE Femto Cell can receive 5G node identifiers and location identifiers for the Small Cells.

In step 220, LTE Femto Cell can send the 5G node identifiers and the 5G location identifier to the Small Cells. In step 224, the Macro eNodeB can initiate a communication session with a communication device. In step 228, the communication device can determine if it has detected a Small Cell of the 4G network. If the Small Cell is detected, then, in step 232, the Small Cell can send the 5G node identifier and the 5G location identifier to the communication device.

In step 236, the communication device can send the 5G node identifier and the 5G location identifier to the Macro eNodeB of the 5G network. In step 240, the Macro eNodeB can determine if it recognizes the 5G identifier and location that is received from the communication device. If so, then, in step 244, the Macro eNodeB of the 5G network can send a request for a handover to the 4G network. In step 248, the LTE Femto Cell can receive a handover initiation signal from the 4G network, and, in step 252, the LTE Femto Cell can initiate the handover.

While for purposes of simplicity of explanation, the respective processes are shown and described as a series of blocks in FIG. 2, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
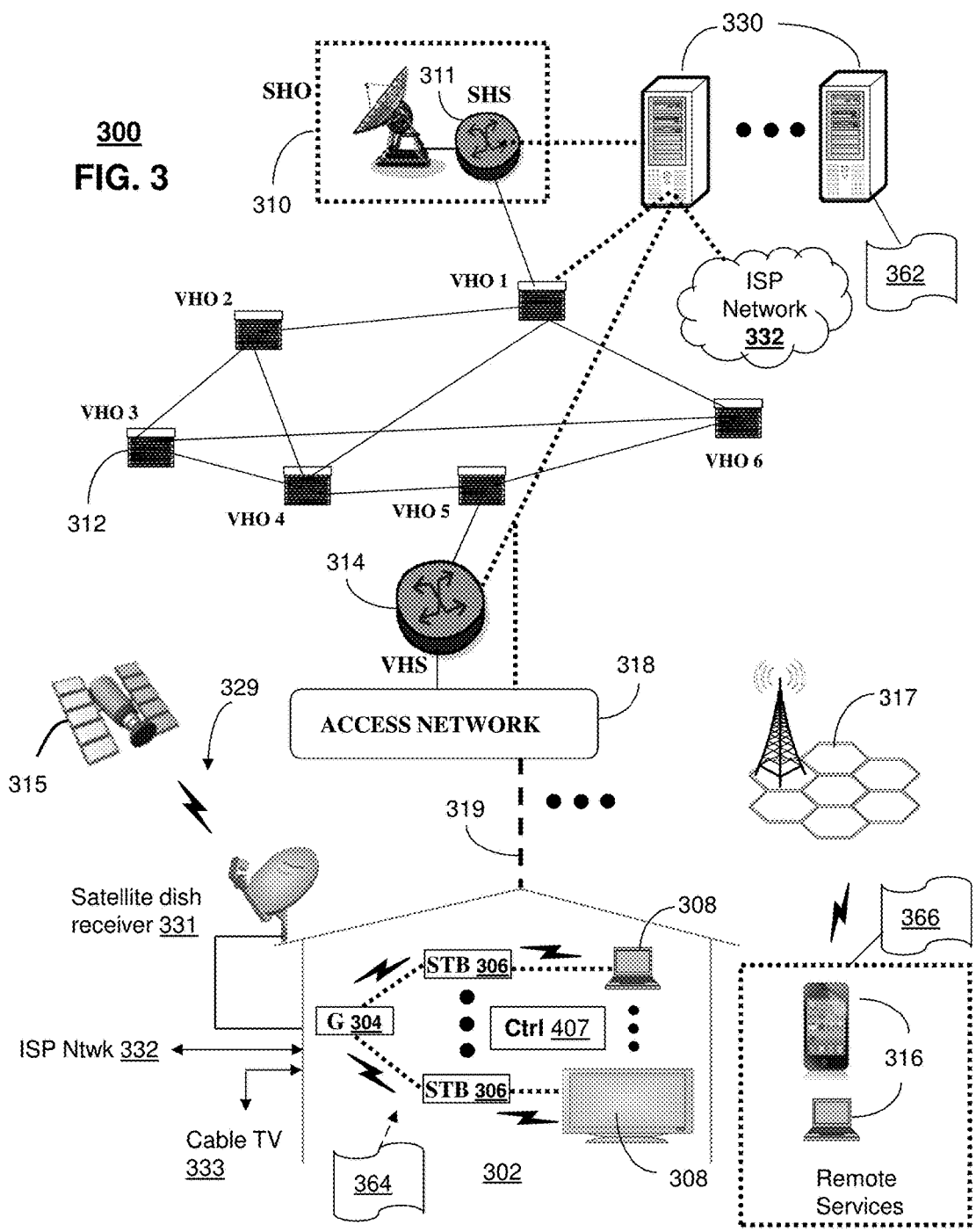
FIGS. 3-4 depicts illustrative embodiments of communication systems that provides communication and media services for communication devices according to embodiments illustrated in FIG. 1.

FIG. 3 depicts an illustrative embodiment of a first communication system 300 for delivering media content. The communication system 300 can represent an Internet Protocol Television (IPTV) media system. Communication system 300 can be overlaid or operably coupled with system 100-200 of FIGS. 1-2 as another representative embodiment of communication system 300. For instance, one or more devices illustrated in the communication system 300 of FIG. 3, for providing a handover process for hand-in of a communication session for a communication device at a Macro eNodeB of a 5G network to an HeNB Small cell node of a 4G network.

The IPTV media system can include a super head-end office (SHO) 310 with at least one super headend office server (SHS) 311 which receives media content from satellite and/or terrestrial communication systems. In the present context, media content can represent, for example, audio content, moving image content such as 2D or 3D videos, video games, virtual reality content, still image content, and combinations thereof. The SHS server 311 can forward packets associated with the media content to one or more video head-end servers (VHS) 314 via a network of video head-end offices (VHO) 312 according to a multicast communication protocol.

The VHS 314 can distribute multimedia broadcast content via an access network 318 to commercial and/or residential buildings 302 housing a gateway 304 (such as a residential or commercial gateway). The access network 318 can represent a group of digital subscriber line access multiplexers (DSLAMs) located in a central office or a service area interface that provide broadband services over fiber optical links or copper twisted pairs 319 to buildings 302. The gateway 304 can use communication technology to distribute broadcast signals to media processors 306 such as Set-Top Boxes (STBs) which in turn present broadcast channels to media devices 308 such as computers or television sets managed in some instances by a media controller 307 (such as an infrared or RF remote controller).

The gateway 304, the media processors 306, and media devices 308 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 306 and subsystems of the IPTV media system for services such as video-on-demand (VoD), browsing an electronic programming guide (EPG), or other infrastructure services.

A satellite broadcast television system 329 can be used in the media system of FIG. 3. The satellite broadcast television system can be overlaid, operably coupled with, or replace the IPTV system as another representative embodiment of communication system 300. In this embodiment, signals transmitted by a satellite 315 that include media content can be received by a satellite dish receiver 331 coupled to the building 302. Modulated signals received by the satellite dish receiver 331 can be transferred to the media processors 306 for demodulating, decoding, encoding, and/or distributing broadcast channels to the media devices 308. The media processors 306 can be equipped with a broadband port to an Internet Service Provider (ISP) network 332 to enable interactive services such as VoD and EPG as described above.

In yet another embodiment, an analog or digital cable broadcast distribution system such as cable TV system 333 can be overlaid, operably coupled with, or replace the IPTV system and/or the satellite TV system as another representative embodiment of communication system 300. In this embodiment, the cable TV system 333 can also provide Internet, telephony, and interactive media services. System 300 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 330, a portion of which can operate as a web server for providing web portal services over the ISP network 332 to wireline media devices 308 or wireless communication devices 316. Communication system 300 can also provide for all or a portion of the computing devices 330 to function as a content server (herein referred to as server 330). The server 330 can use computing and communication technology to perform function 362, which can include among other things, the techniques described by method 200 of FIG. 2. For instance, function 362 of server 330 can be similar to the functions described for the LTE Femto Gateway 130 of FIG. 1 in accordance with method 200. The media processors 306 and wireless communication devices 316 can be provisioned with software functions 364 and 366, respectively, to utilize the services of server 330. For instance, functions 364 and 366 of media processors 306 and wireless communication devices 316 can be similar to the functions described for the media processor 106 and the mobile communication device 116 of FIG. 1 in accordance with method 200.

Multiple forms of media services can be offered to media devices over landline technologies such as those described above. Additionally, media services can be offered to media devices by way of a wireless access base station 317 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 4:
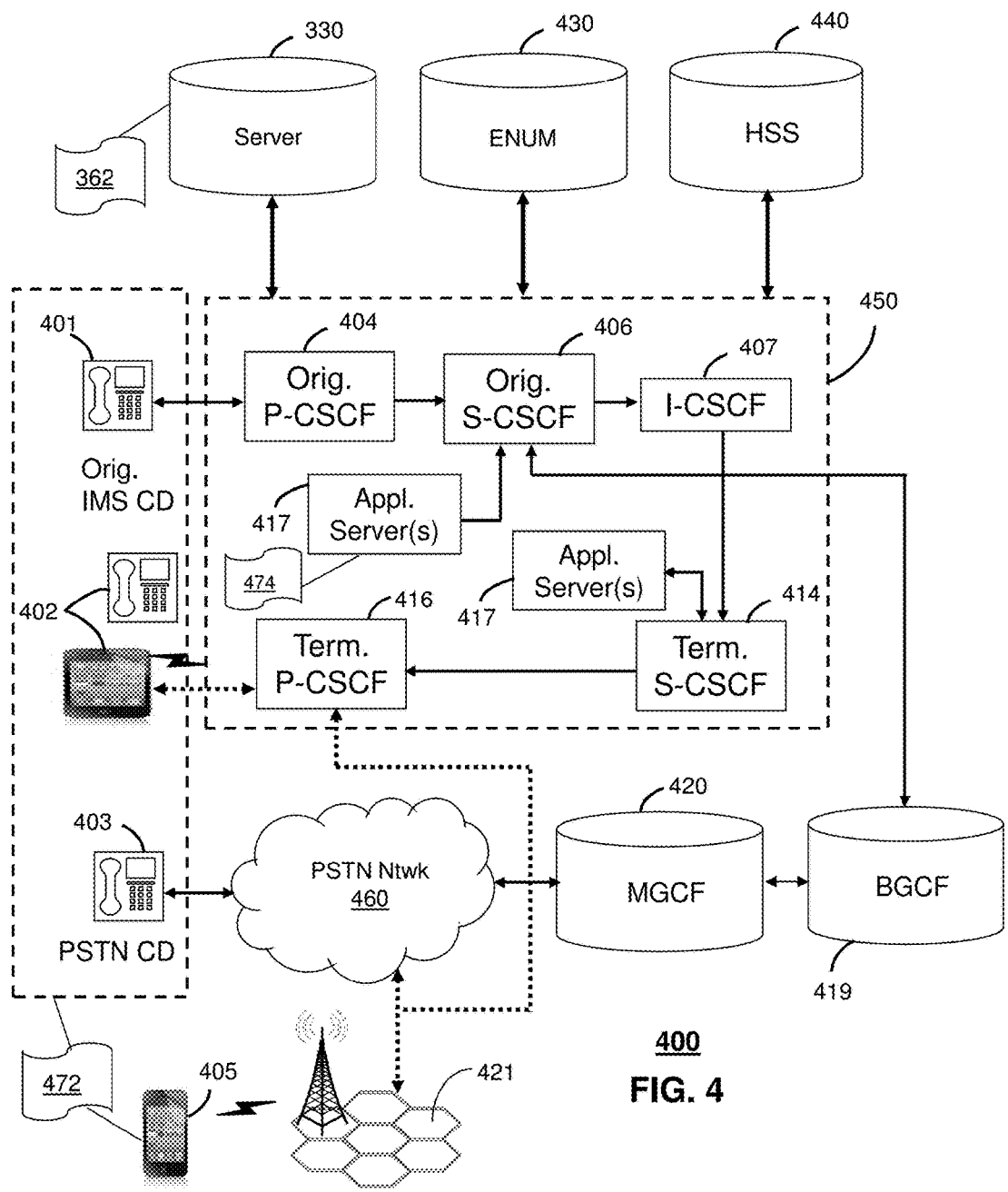

FIG. 4 depicts an illustrative embodiment of a communication system 400 employing an IP Multimedia Subsystem (IMS) network architecture to facilitate the combined services of circuit-switched and packet-switched systems. Communication system 400 can be overlaid or operably coupled with system 100 of FIG. 1 and communication system 400 as another representative embodiment of communication system 400 for providing a handover process for hand-in of a communication session from a Macro eNodeB of a 5G network to a HeNB Small cell node of a 4G network.

Communication system 400 can comprise a Home Subscriber Server (HSS) 440, a tElephone NUmber Mapping (ENUM) server 435, and other network elements of an IMS network 450. The IMS network 450 can establish communications between IMS-compliant communication devices (CDs) 401, 402, Public Switched Telephone Network (PSTN) CDs 403, 405, and combinations thereof by way of a Media Gateway Control Function (MGCF) 420 coupled to a PSTN network 460. The MGCF 420 need not be used when a communication session involves IMS CD to IMS CD communications. A communication session involving at least one PSTN CD may utilize the MGCF 420.

IMS CDs 401, 402 can register with the IMS network 450 by contacting a Proxy Call Session Control Function (P-CSCF) which communicates with an interrogating CSCF (I-CSCF), which in turn, communicates with a Serving CSCF (S-CSCF) to register the CDs with the HSS 440. To initiate a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to one or more application servers (AS) 417 that can provide a variety of services to IMS subscribers.

For example, the application servers 417 can be used to perform originating call feature treatment functions on the calling party number received by the originating S-CSCF 406 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 406 can submit queries to the ENUM system 435 to translate an E.164 telephone number in the SIP INVITE message to a SIP Uniform Resource Identifier (URI) if the terminating communication device is IMS-compliant. The SIP URI can be used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE message to the terminating S-CSCF 414. The terminating S-CSCF 414 can then identify a terminating P-CSCF 416 associated with the terminating CD 402. The P-CSCF 416 may then signal the CD 402 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 4 may be interchangeable. It is further noted that communication system 400 can be adapted to support video conferencing. In addition, communication system 400 can be adapted to provide the IMS CDs 401, 402 with the multimedia and Internet services.

If the terminating communication device is instead a PSTN CD such as CD 403 or CD 405 (in instances where the cellular phone only supports circuit-switched voice communications), the ENUM system 435 can respond with an unsuccessful address resolution which can cause the originating S-CSCF 406 to forward the call to the MGCF 420 via a Breakout Gateway Control Function (BGCF) 419. The MGCF 420 can then initiate the call to the terminating PSTN CD over the PSTN network 460 to enable the calling and called parties to engage in voice and/or data communications.

It is further appreciated that the CDs of FIG. 4 can operate as wireline or wireless devices. For example, the CDs of FIG. 4 can be communicatively coupled to a cellular base station 421, a femtocell, a WiFi router, a Digital Enhanced Cordless Telecommunications (DECT) base unit, or another suitable wireless access unit to establish communications with the IMS network 450 of FIG. 4. The cellular access base station 421 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 4.

Cellular phones supporting LTE can support packet-switched voice and packet-switched data communications and thus may operate as IMS-compliant mobile devices. In this embodiment, the cellular base station 421 may communicate directly with the IMS network 450 as shown by the arrow connecting the cellular base station 421 and the P-CSCF 416.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The IRMS 430 of FIG. 4 can be operably coupled to communication system 400 for purposes similar to those described above. IRMS 430 can perform function 462 and thereby provide NB-IoT device routing services to the CDs 401, 402, 403 and 405 of FIG. 4, similar to the functions described for server 130 of FIG. 1 in accordance with method 200 of FIG. 2. CDs 401, 402, 403 and 405, which can be adapted with software to perform function 472 to utilize the services of the IRMS 430, similar to the functions described for communication devices 116 of FIG. 1 in accordance with method method 200 of FIG. 2. IRMS 430 can be an integral part of the application server 417 performing function 474, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3rd Generation Partnership Project (3GPP). It is further noted that some or all embodiments of the subject disclosure may in whole or in part modify, supplement, or otherwise supersede final or proposed standards published and promulgated by 3GPP.

Figure 5:
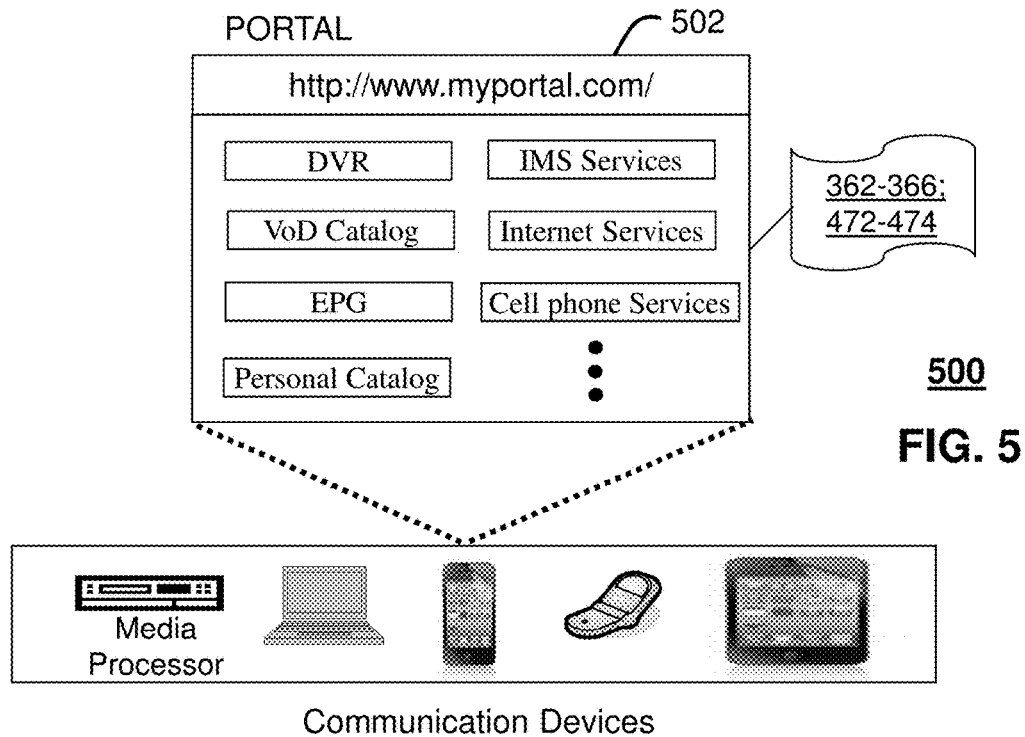
FIG. 5 depicts an illustrative embodiment of a web portal for interacting with the communication systems of FIGS. 1 and 3-4.

FIG. 5 depicts an illustrative embodiment of a web portal 502 of a communication system 500. Communication system 500 can be overlaid or operably coupled with system 100 of FIG. 1, communication system 300, and/or communication system 400 as another representative embodiment of system 100 of FIG. 1, communication system 300, and/or communication system 400. The web portal 502 can be used for managing services of system 100 of FIG. 1 and communication systems 300-400. A web page of the web portal 502 can be accessed by a Uniform Resource Locator (URL) with an Internet browser using an Internet-capable communication device such as those described in FIG. 1 and FIGS. 3-4. The web portal 502 can be configured, for example, to access a media processor 306 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 306. The web portal 502 can also be used for provisioning IMS services described earlier, provisioning Internet services, provisioning cellular phone services, and so on.

The web portal 502 can further be utilized to manage and provision software applications 362-366, and 472-474 to adapt these applications as may be desired by subscribers and/or service providers of system 100 of FIG. 1, and communication systems 300-400. For instance, users of the services provided by the LTE Femto Gateway 130 or 430 can log into their on-line accounts and provision the LTE Femto Gateway 110 or 430 with describe a feature that a user may want to program such as user profiles, provide contact information to server to enable it to communication with devices described in FIGS. 1-4 and so on. Service providers can log onto an administrator account to provision, monitor and/or maintain the system 100 of FIG. 1 or LTE Femto Gateway 430.

Figure 6:
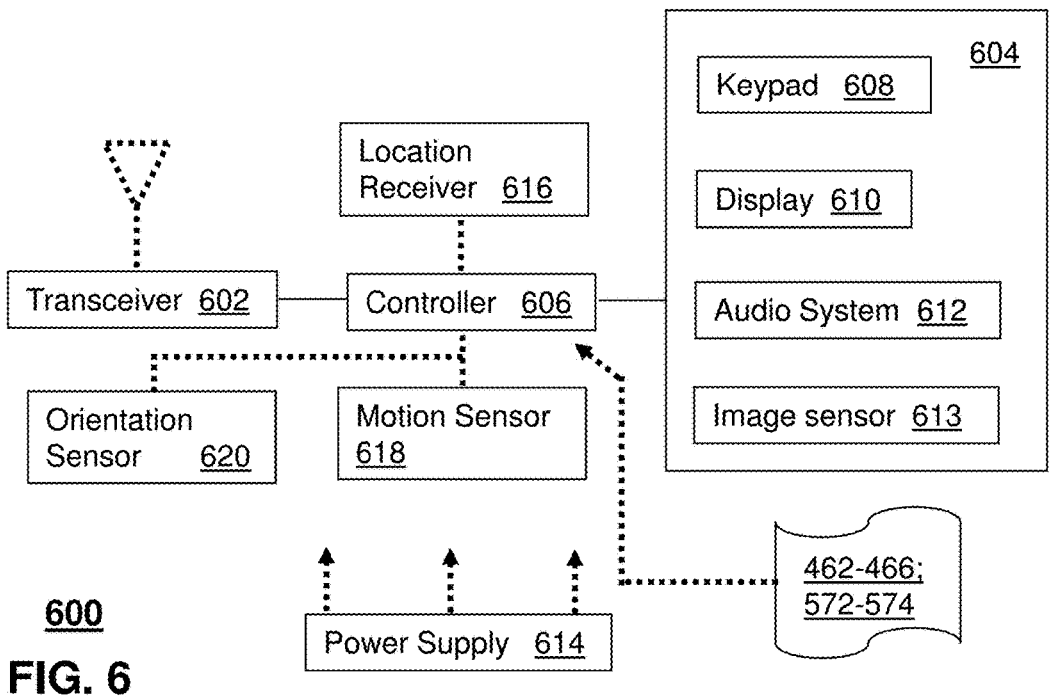
FIG. 6 depicts illustrative embodiments of a communication device.

FIG. 6 depicts an illustrative embodiment of a communication device 600. Communication device 600 can serve in whole or in part as an illustrative embodiment of the devices depicted in FIG. 1 and FIGS. 3-4 and can be configured to perform portions of method 200 of FIG. 2.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of devices of FIG. 1, a media processor, media devices, or the portable communication devices 116 of FIG. 1, as well as the IMS CDs 401-402 and PSTN CDs 403-405 of FIG. 4. It will be appreciated that the communication device 600 can also represent other devices that can operate in systems of FIG. 1, communication system 400 of FIG. 4, such as a gaming console and a media player. In addition, the controller 606 can be adapted in various embodiments to perform the functions 462-474, respectively.

Upon reviewing the aforementioned embodiments, it would be evident to an artisan with ordinary skill in the art that said embodiments can be modified, reduced, or enhanced without departing from the scope of the claims described below.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
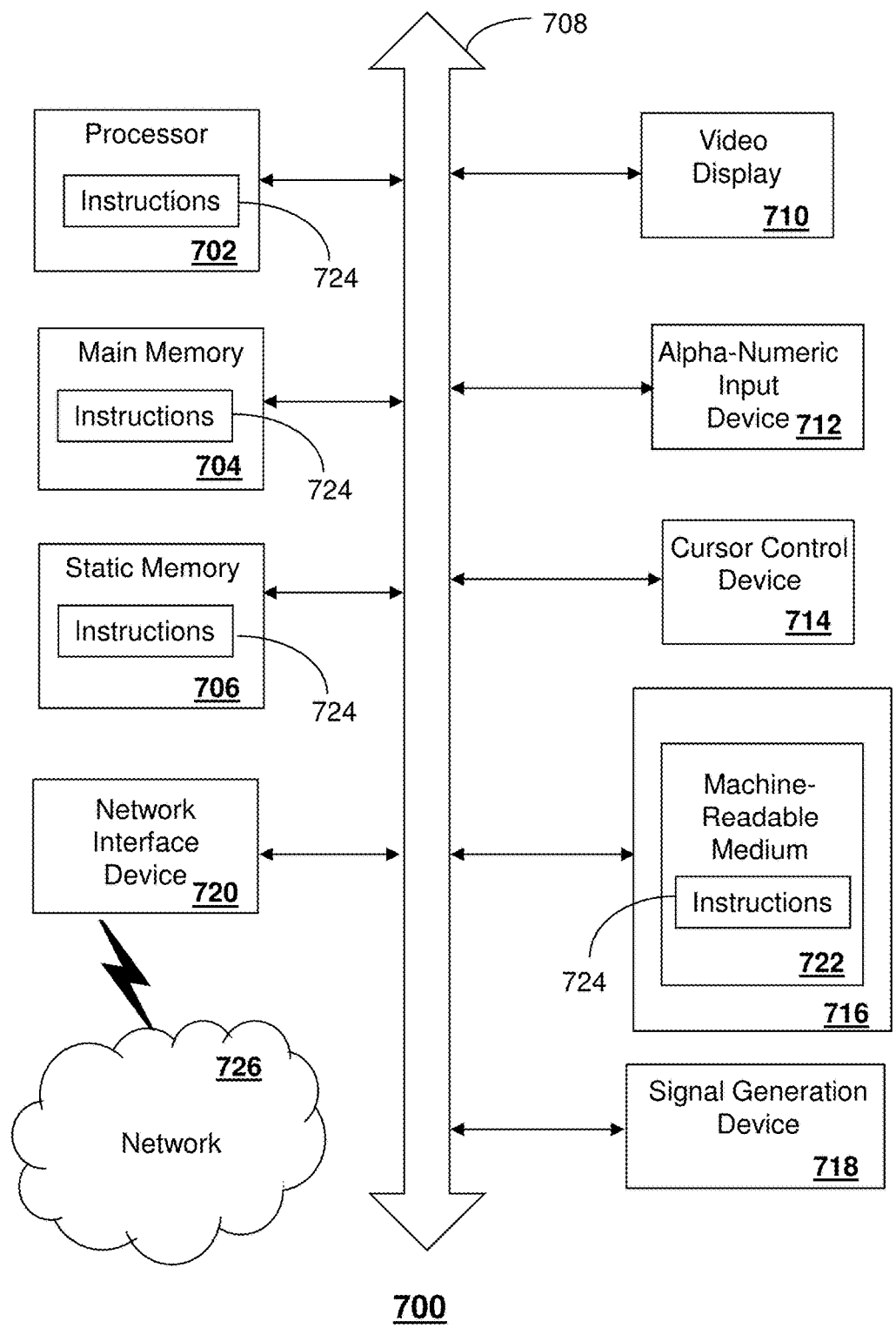
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the IRMS 430, the media processor, the LTE Femto Cell 130, and the communication device 116. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable storage medium, comprising executable instructions that, when executed by a processing system including a processor, facilitate performance of operations, comprising:
   establishing a communication link with a small cell node of a first network, wherein management network elements of the first network process both control plane information and user plane information;
   receiving a first node identifier for the small cell node that functions as a node identifier in a second network, wherein the second network comprises a control plane separate from a user plane, wherein a software defined controller of the second network can implement a group of virtual network function elements;
   receiving, from the first network, a first location identifier associated with a location known to the second network;
   transmitting the first node identifier and the first location identifier to the small cell node via the communication link;
   receiving a handover initiation signal from a macro cell node of the second network for a handover from the macro cell node to the small cell node of the first network of a communication session associated with a first wireless communication link to a communication device, wherein a request for the handover is initiated by the macro cell node in the second network responsive to identification of the first node identifier and the first location identifier in a first wireless signal from the communication device, wherein the macro cell node requests the first node identifier and the first location identifier from the communication device, and wherein the first node identifier and the first location identifier are obtained by the communication device via a second wireless signal from the small cell node of the first network; and
   establishing a second wireless communication link to the communication device via the small cell node of the first network to complete the handover of the communication session to the small cell node of the first network.

2. The non-transitory machine-readable storage medium of claim 1, wherein receiving of the handover initiation signal comprises receiving the handover initiation signal from the small cell node via a mobility management entity of the first network, wherein the first network comprises a 4G network, and wherein the second network comprises a 5G network.

3. The non-transitory machine-readable storage medium of claim 2, wherein the request for the handover of the communication session is transmitted from the macro cell node of the second network to the mobility management entity of the first network via a control plane function of the second network.

4. The non-transitory machine-readable storage medium of claim 2, wherein the mobility management entity of the first network receives the request for the handover of the communication session from the second network.

5. The non-transitory machine-readable storage medium of claim 1, wherein the small cell node transmits the second wireless signal to the communication device responsive to detecting the communication device via a third wireless signal.

6. The non-transitory machine-readable storage medium of claim 1, wherein the macro cell node identifies the first node identifier and the first location identifier in the first wireless signal from the communication device.

7. The non-transitory machine-readable storage medium of claim 1, wherein the first node identifier is received from a mobility management entity of the first network.

8. The non-transitory machine-readable storage medium of claim 7, wherein the mobility management entity of the first network receives the first node identifier from the second network.

9. The non-transitory machine-readable storage medium of claim 1, wherein the first location identifier is received from a mobility management entity of the first network.

10. The non-transitory machine-readable storage medium of claim 9, wherein the mobility management entity generates the first location identifier from location information generated by the small cell node.

11. The non-transitory machine-readable storage medium of claim 1, wherein the operations further comprise establishing another communication link with a second small cell node.

12. The non-transitory machine-readable storage medium of claim 11, wherein operations further comprise:
   receiving, from the first network a second node identifier associated with the second network; and
   transmitting the second node identifier and the first location identifier to the second small cell node via the other communication link.

13. A device, comprising:
   a processing system including a processor; and
   a memory that stores executable instructions that, when executed by the processing system, facilitate performance of operations, comprising:

receiving a first node identifier for a small cell node of a first network that functions as a node identifier in a second network, wherein the second network comprises a control plane separate from a user plane, wherein a software defined controller of the second network can implement a group of virtual network function elements;

receiving a first location identifier associated with a location known to the second network;

transmitting the first node identifier and the first location identifier to the small cell node of the first network, wherein management network elements of the first network process both control plane information and user plane information;

receiving a handover initiation signal from a macro cell node of the second network for a handover from the macro cell node to the small cell node of the first network of a communication session associated with a first wireless communication link to a communication device, wherein a request for the handover is initiated by the macro cell node in the second network responsive to identification of the first node identifier and the first location identifier in a first wireless signal from the communication device, wherein the macro cell node requests the first node identifier and the first location identifier from the communication device, and wherein the first node identifier and the first location identifier are obtained by the communication device via a second wireless signal from the small cell node; and establishing a second wireless communication link to the communication device via the small cell node to complete the handover of the communication session to the small cell node of the first network.

14. The device of claim 13, wherein the operations further comprise:
establishing a communication link with the small cell node, wherein the second wireless communication link to the communication device is established via the communication link.

15. The device of claim 13, wherein the macro cell node identifies the first node identifier and the first location identifier in the first wireless signal from the communication device.

16. The device of claim 13, wherein the request for the handover of the communication session is transmitted from the macro cell node of the second network to a mobility management entity of the first network via a control plane function of the second network.

17. The device of claim 13, wherein the small cell node transmits the second wireless signal to the communication device responsive to detecting the communication device via a third wireless signal.

18. A method, comprising:
establishing a communication link with a small cell node of a first network;

receiving, by a processing system including a processor and from the first network, a first node identifier for the small cell node of the first network that functions as a node identifier in a second network, wherein management network elements of the first network process both control plane information and user plane information, wherein the second network comprises a control plane separate from a user plane, wherein a software defined controller of the second network can implement a group of virtual network function elements;

receiving, from the first network, a first location identifier associated with a location known to the second network;

transmitting, by the processing system, the first node identifier and the first location identifier to the small cell node of the first network via the communication link;

receiving, by the processing system, a handover initiation signal from a macro cell node of the second network for a handover from the macro cell node to the small cell node of the first network of a communication session associated with a first wireless communication link to a communication device, wherein a request for the handover is initiated by the macro cell node in the second network responsive to identification of the first node identifier and the first location identifier in a first wireless signal from the communication device, wherein the macro cell node requests the first node identifier and the first location identifier from the communication device, and wherein the first node identifier and the first location identifier are obtained by the communication device via a second wireless signal from the small cell node of the first network; and establishing, by the processing system, a second wireless communication link to the communication device via the small cell node of the first network to complete the handover of the communication session to the small cell node of the first network.

19. The method of claim 18, further comprising transmitting, by the processing system, a first location identifier to the small cell node, wherein the request is further initiated by identification of the first location identifier in the first wireless signal from the communication device.

20. The method of claim 19, wherein the macro cell node requests the first location identifier from the communication device.

* * * * *